Dec. 25, 1928.

O. R. LUDWIG 1,696,853

FOLDING TRUNK

Filed March 25, 1927  3 Sheets-Sheet 1

O. R. Ludwig INVENTOR

BY Victor J. Evans ATTORNEY

Dec. 25, 1928.
O. R. LUDWIG
1,696,853
FOLDING TRUNK
Filed March 25, 1927 3 Sheets-Sheet 2
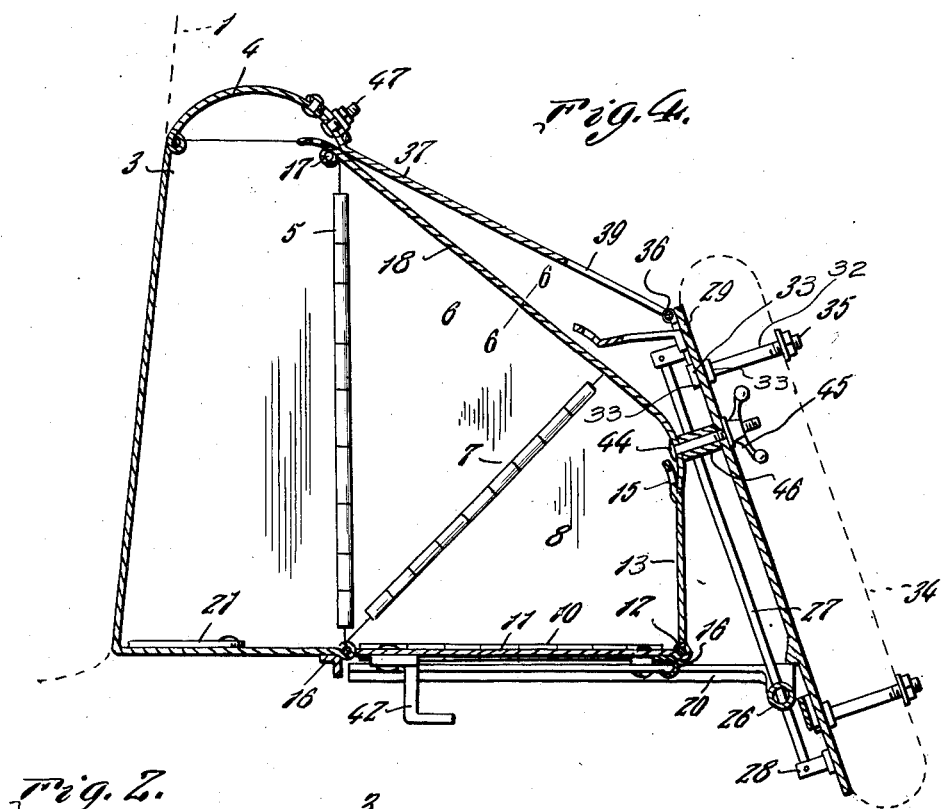

Dec. 25, 1928.
O. R. LUDWIG
1,696,853
FOLDING TRUNK
Filed March 25, 1927    3 Sheets-Sheet 3
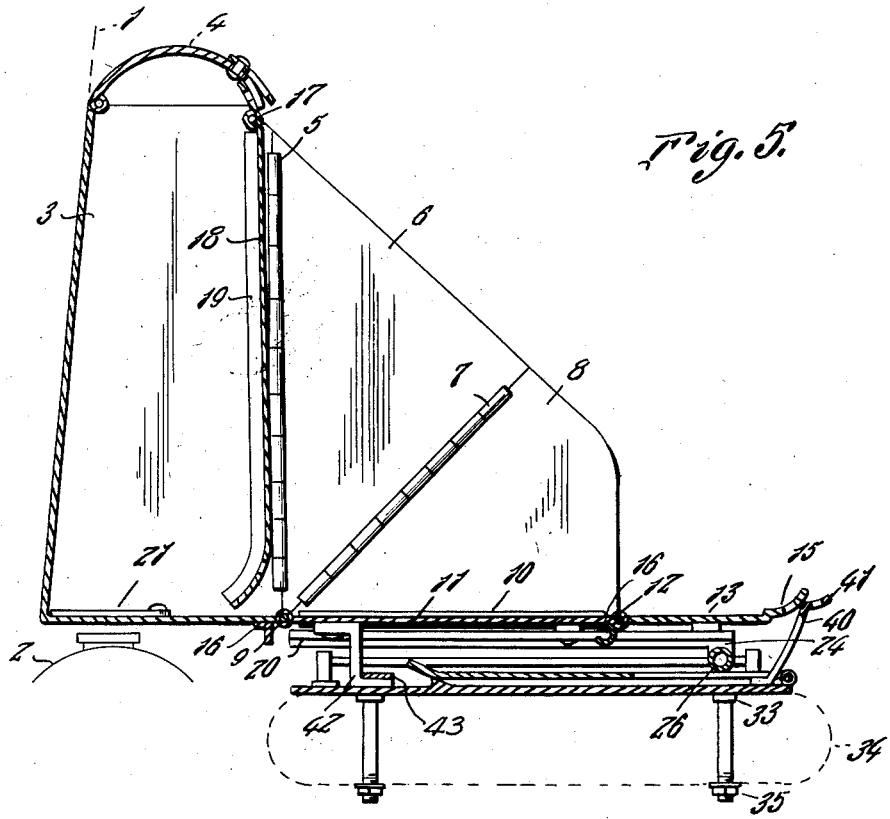
O. R. Ludwig
INVENTOR
BY Victor J. Evans
ATTORNEY Patented Dec. 25, 1928.

1,696,853

UNITED STATES PATENT OFFICE.

OTTO R. LUDWIG, OF GARVIN, MINNESOTA.

FOLDING TRUNK.

Application filed March 25, 1927. Serial No. 178,360.

My present invention has reference to a folding carrier for automobiles, commonly referred to as a trunk.

An object is the provision of a carrier of this type which may be partly housed in the rear of the body of an automobile, or fixed directly to part of the body, and which is of a construction whereby the same may be arranged to provide a small and a large compartment or two compartments, one comparatively narrow and the other comparatively large, and further wherein the outer compartment may be folded snugly against the inner compartment when the carrier is not desired for use, the outer compartment of the carrier having thereon a spare tire carrier of a particular, peculiar and novel construction, the same being swingably and slidably associated with the device so as to be moved out of the way or under the trunk or carrier when access to the compartments therein is desired.

A further object is to improve the construction of folding carriers upon which I was granted U. S. Letters Patent No. 1,571,850, on Feb. 3, 1926.

To the attainment of the foregoing and other objects which will present themselves as the nature of the invention is better understood, the improvement also resides in certain other novel features of construction, combination and operative association of parts, one satisfactory embodiment of which is disclosed by the accompanying drawings.

In the drawings:

Figure 2 is a sectional view on the line 2—2 of Figure 1.

Figure 4 is an approximately central longitudinal sectional view showing the device in its fully expanded condition.

Figure 5 is a similar sectional view showing the outer compartment open and the spare tire rack slid beneath the bottom of the improvement.

Figure 6 is a detail sectional view approximately on the line 6—6 of Figure 4.

Figure 7 is a rear elevation of the spare tire carrier, with parts in section.

Figure 8 is a detail sectional view on the line 8—8 of Figure 2.

Figure 1:
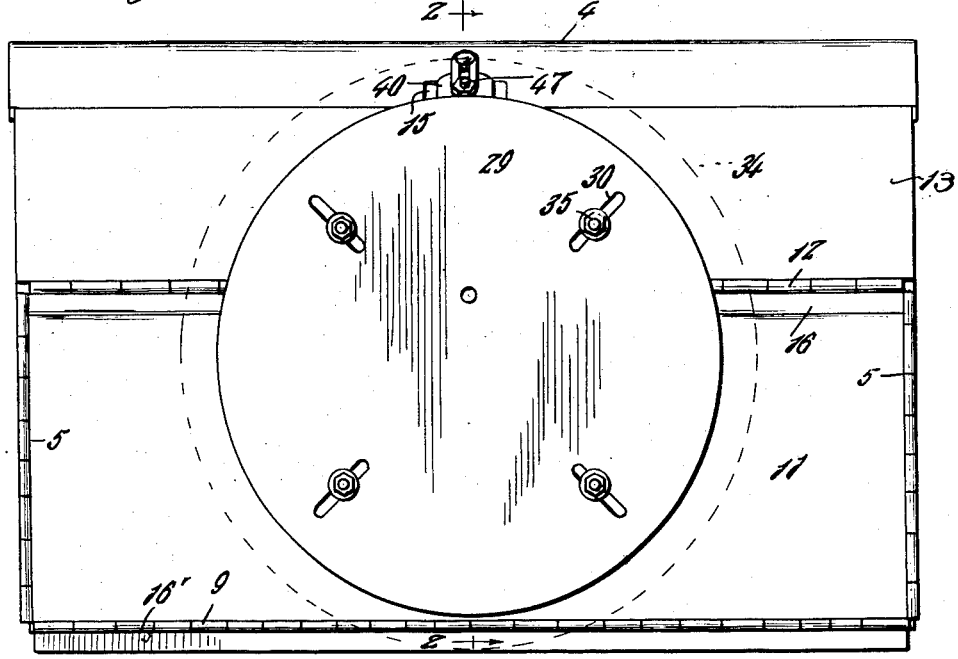
Figure 1 is a rear elevation of the improvement.
Figure 3:
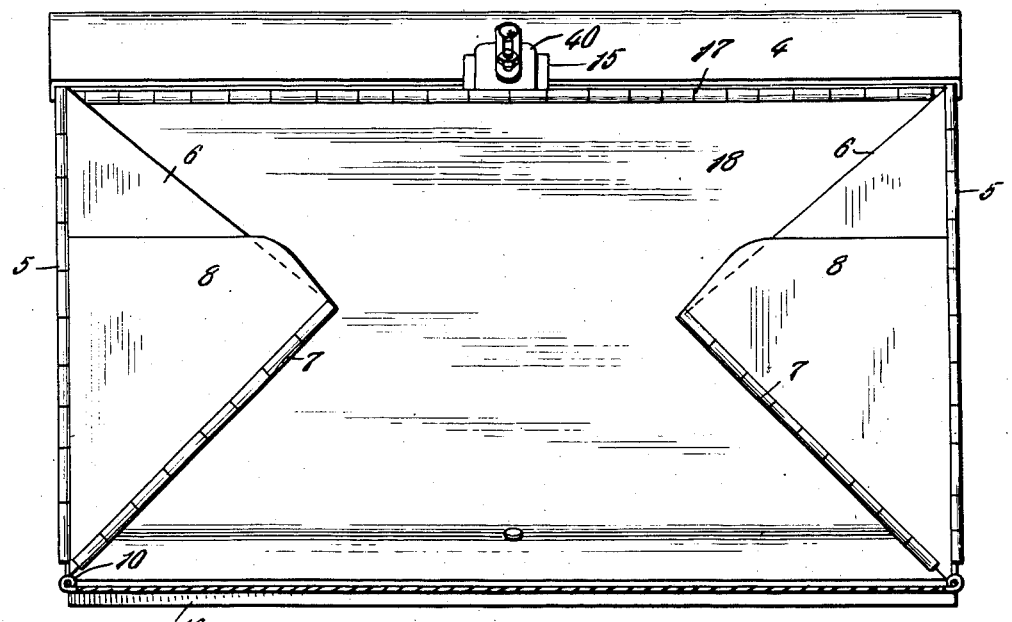
Figure 3 is a sectional view on the line 3—3 of Figure 2.

In the showing of the drawings, the back of an automobile, to which the improvement is attached, is disclosed by the dotted lines and is indicated by the numeral 1. It is to be noted by reference to Figure 5 of the drawings, that the improvement is positioned directly above the gasoline tank 2 for the automobile, but it will be noted that as the description progresses that I provide means for replenishing the supply of gasoline to the tank without interfering with my improvement in its position relative to said tank. The improvement comprises a substantially rectangular portion 3 whose rear wall, in the showing of the drawings, is directly connected to the back 1 of the automobile body. The substantially rectangular portion 3 has its back wall arranged at an inclination and its top open. This open top, however, is designed to be closed by a hinged cover 4, the same being preferably arched in cross section. Hinged to the outer edges of the trunk member 3, as indicated by the numeral 5, there are wings 6. Each wing is in the nature of a metal plate and the outer edge thereof is cut angularly. The wing is thus of substantially triangular formation and hinged to the outer and lower edge of each of the said wings, as at 7, there is the angle edge of a second wing or plate 8. The upper edge of the plate 8 is cut at the same inclination as is the upper edge of the plate or wing 9, but the outer edge of the plate 8 is straight, the corner between the straight and angle edges being rounded. Hinged to the outer edge at the bottom of the member 3, as at 9, and likewise hinged to the normally lower and straight edges of the wings 8, as at 10, there is a plate 11, and hinged, as at 12, to the outer edge of the plate 11 there is a shorter plate 13. This plate at its outer edge, is formed with an inwardly directed rounded lip 15.

A transverse brace 16 is provided at the under face and at the outer edge of the bottom of the compartment 3, and a similarly arranged brace 16 is arranged at the outer or hinged end of the plate 11. These braces, of course, are employed for reinforcing the elements to which they are connected.

Hinged, as at 17, to the upper corners of the compartment 3 there is a combined cover and division plate 18. This plate has its sides flanged, as at 19. When the device is in a position illustrated by Figure 4 of the drawings, the plate 18 is swung over the wings 6 and 8, the flanges 19 contacting with the outer walls of the said wings. Also when in this position the plate 13 is swung against the outer straight edges of the wings 8. The plate 17 is sustained in this position in a manner as will be hereinafter described. When the parts are thus arranged the trunk provides a single and comparatively wide compartment. When the parts are in the position illustrated in Figure 5 of the drawings the plate 18 is swung between the wings 6 and 8 and align with the outer edge of the compartment 3. As the construction is wholly of metal the wings 6 and 8 may be slightly bulged to permit of the flanges 19 of the plate 18 being moved between the wings and the pressure exerted by the flanges 19 against the sides of the compartment 3 will hold the plate 18 properly positioned to close said compartment. This provides the device with the inner comparatively narrow compartment and an outer and widened compartment. In this position it is to be seen that the plate 13 is swung into longitudinal alignment with the plate 11, and the plate 13 is held in such position by contacting engagement thereof directly with lugs or enlargements formed on spaced bars 20 that are fixedly secured to the outer face of the plate 11 and extend beyond the hinged edge thereof.

The lower or bottom wall of the compartment 3 of the trunk or carrier has an opening therethrough that is arranged directly opposite the filler spout for the tank 2, and this opening is normally closed by a swingable plate 21 that is pivoted, as at 22, to the said bottom wall of the compartment 3. The swingable closure plate 21 is provided with an upstanding lug 23 that affords a finger hold.

The bars 20 on the outer ends thereof are provided each with an angle lug 24, the said lugs having aligning openings for trunnions 25 on the ends of a preferably tubular member 26. Movable through openings in the tubular member 26 there is a pair of rods 27. These rods have their ends secured to offset lugs or brackets 28 that are fixed to the disc body 29 of the spare tire carrier. The disc 29, at rightangular points has angularly arranged elongated openings 30 therethrough for the reception of shanks of headed bolts 32, the said bolts having shouldered portions 33 that contact with the outer face of the disc and hold the bolts on the disc and permit of the said bolts sliding through the slots 30 in the said disc. These bolts pass through openings in the disc wheel of a spare tire carrying wheel 34, or between the spokes of an ordinary tire carrying wheel, adjustable means 35 being screwed on the outer end of the bolts for holding the wheel on the disc.

Hinged, as at 36, to one edge of the disc 29, there is a strap 37. The strap from its hinged end is centrally cut-away or slotted for a suitable distance, as at 39, and fixed on the disc and passing through the said slot 39 there is a curved finger 40 that merges into a lipped end 41.

Fixed on the outer face of the plate 11, preferably at the center thereof, and adjacent to its hinge 9 there is an angle member or hook 42. On the inner face of the disc 29 there is a socket member 43. The beak of the hook 42 is designed to be received in this socket when the disc is swung on its hinge connection with the member 26 and moved bodily, through the medium of the rods 27, that pass through the openings in the said member 26, in a line with the outer face of the plate 11. Thus when the device is set up to provide an inner closed compartment 3 and an outer open compartment the tire carrier and the spare wheel connected therewith are arranged in a position that will not interfere with access being obtained to either of said compartments. A suitable latching means may be provided for holding the disc 29 in this position.

The rounded outer edge of the combined cover and division plate 18 has an opening therethrough for the reception of a bolt member 44 and this bolt member is designed to be passed through an opening in the disc 29 and to be engaged by a nut 45 when the device is set up to provide a single compartment, as disclosed by Figure 4 of the drawings. Obviously when in this position the disc 29 is swung upon the member 26 and slid to bring the opening therein opposite the bolt 44. Arranged around the bolt and contacting with the said rounded portion of the plate 18 and the inner face of the disc there is a sleeve 46 that holds the disc properly spaced with respect to the trunk. Also when in this position the strap 37 is swung and has its outer edge engaged by a removable and adjustable element 47 carried by the top 4 of the compartment 3. By this arrangement it will be seen that the trunk or carrier is sustained in a fully closed condition and the cover plates therefor are in tight contact with the sides and edges of the trunk proper.

When the device is to be arranged in the position illustrated by Figure 2 of the drawings the wings 6 and 8 are folded inwardly on their hinges 7, and the plate 11 is folded upon its hinges 10 against the folded wings 6 and 8. The plate 13 is swung to bring its lipped end 15 to receive through the opening therein the element 47 and the finger 40 is also moved to bring its lip 41 to receive through the opening therein the said element 47. As disclosed by the drawings the element 47 is in the nature of a bolt which is engaged by a nut, and when the parts are arranged as above described and as disclosed by Figure 2 of the drawings, the trunk will be folded and closed and the tire carrying disc 29 will be arranged outwardly of but in a vertical position with respect to the trunk or carrier.

The improvement is of a comparatively simple construction and may be easily attached to any type of vehicles. The improvement is, of course, susceptible to such changes and modifications as fairly fall within the scope of what I claim without departing from or sacrificing any of the advantages of the invention.

Having described the invention, I claim:

1. In a device for the purpose set forth, a box-like member having an open front and an open top and also having an opening at the bottom thereof, a cover plate for the last mentioned opening, a hinged cover for the top, side members hinged to the outer edges of the sides of the box, each of said sides comprising two members having angle confronting edges which are hingedly connected at said sides susceptible to inward swinging, a plate hingedly secured to the outer lower edge of the box and sides, a comparatively short lip carrying plate hingedly secured to the outer edge of the last mentioned plate, a flanged combined cover and partition plate hingedly secured to the top of the box, and swingable over the sides and engageable with the lip of the last mentioned plate when so swung and likewise swingable between the sides and means for locking the combined cover and partition plate to the lip of the last mentioned plate for closing the box-like member when the sides thereof are extended.

2. In a device for the purpose set forth, a box-like member having an open front and an open top, a hinged cover for the top, side members hingedly secured to the outer edges of the box, each of said sides comprising two members having angle confronting edges which are hingedly connected to permit of the inward folding of the sides against the box, a plate hingedly secured to the lower edge of the box and to the lower edge of the sides, a comparatively short plate having an outer lipped end and having its inner end hingedly secured to the outer edge of the first mentioned plate, a flanged combined cover and partition plate hinged to the top of the box, swingable over the sides and engageable with the lip of the comparatively short plate when in covering position and likewise swingable between the sides to provide a partition between the box and the sides, a disc slidably and swingably associated with the first mentioned bottom plate, a strap member hingedly secured to the disc and designed to be swung over the cover plate when these plates are arranged over the sides, and means for latching the strap to the cover for the box.

3. In a device for the purpose set forth, a box-like member having an open top and an open front, a hinged closure for the top, side members hingedly secured to the outer edges of the sides of the box, said sides, each comprising two members having angle confronting edges which are hingedly connected to permit of the inward folding of the said sides, a plate hingedly secured to the lower outer edge of the box and to the lower edges of the sides a bar fixed on the outer face of said plate, a plate hingedly secured to the outer edge of the last mentioned plate and resting on the bar when swung to align with said last mentioned plate, a revoluble element pivotally connected to the bar, rods slidable through said element, a disc on which the rods are fixed, a socket on the disc, a hook on the first mentioned lower plate to be received in the socket when the disc is in one position, a finger on the disc, a pivoted strap also on the disc, said disc having radial openings, bolts adjustably secured in said openings, adapted to provide securing means for a spare tire, all as and for the purpose set forth.

In testimony whereof I affix my signature.

OTTO R. LUDWIG.